US007036436B2

(12) United States Patent  (10) Patent No.: US 7,036,436 B2
MacDonald et al.  (45) Date of Patent: May 2, 2006

(54) MOUNTING SYSTEM REEVED TO MOVE AN OBJECT IN TWO-DIMENSIONS AND METHODS RELATING TO SAME

(75) Inventors: Alex MacDonald, Porter Ranch, CA (US); Jim Rodnunsky, Granada Hills, CA (US)

(73) Assignee: Cablecam International Inc., Granada Hills, CA (US)

( * ) Notice: Subject to any disclaimer, the term of this patent is extended or adjusted under 35 U.S.C. 154(b) by 0 days.

(21) Appl. No.: 10/709,918

(22) Filed: Jun. 4, 2004

(65) Prior Publication Data
US 2005/0087090 A1   Apr. 28, 2005

Related U.S. Application Data

(63) Continuation-in-part of application No. 10/605,778, filed on Oct. 25, 2003.

(51) Int. Cl.
B61B 7/00 (2006.01)
(52) U.S. Cl. ............................ 104/178; 212/76; 212/98
(58) Field of Classification Search ................ 104/117, 104/112, 115, 116, 180; 212/76, 77, 81, 212/82, 83, 84, 85, 98, 312, 314, 320, 322, 212/223
See application file for complete search history.

(56) References Cited

U.S. PATENT DOCUMENTS

| 2,035,107 | A | * | 3/1936 | Voss ............................. 212/87 |
| 3,973,680 | A | * | 8/1976 | van der Lely et al. ........ 212/76 |
| 4,864,937 | A |   | 9/1989 | Kunczynski |
| 5,107,771 | A | * | 4/1992 | Kainz ......................... 105/149 |
| 5,113,768 | A |   | 5/1992 | Brown |
| 5,224,426 | A | * | 7/1993 | Rodnunsky et al. ........ 104/112 |
| 6,145,679 | A |   | 11/2000 | Walters |
| 6,199,829 | B1 |   | 3/2001 | Brown et al. |

FOREIGN PATENT DOCUMENTS

FR               992069         10/1951

* cited by examiner

*Primary Examiner*—Mark T. Le
(74) *Attorney, Agent, or Firm*—Dalina Law Group, P.C.

(57) ABSTRACT

Embodiments of the invention move objects throughout two-dimensional space by using a support line that is coupled with both opposing sides of the platform. This line controls the Y-axis motion and Z-axis motion of the platform and is designated the YZ movement line. Displacing a portion of the YZ movement line allows vertical displacement of the platform to be traversed. There is no need for a complex computer control system since the Z-axis displacement is substantially independent of horizontal movement over a coverage area serviced by the platform. A mounting beam for positioning and supporting the Z-axis and Y-axis motors and visual display element(s) and other optional multimedia devices may also be positioned independently of the platform. In addition, since the line is commanded from one point, distantly located motors and electrical cables are not required. Many types of useful devices may then be attached to the platform including devices that require external power or devices that possess their own power and are operated via wireless signals.

6 Claims, 11 Drawing Sheets

MOUNTING SYSTEM REEVED TO MOVE AN OBJECT IN TWO-DIMENSIONS AND METHODS RELATING TO SAME

This application is a continuation in part of U.S. patent application Ser. No. 10/605,778, filed Oct. 25, 2003 pending entitled "System and Method for Moving Objects within Two-Dimensional Space" the specification of which is hereby incorporated herein by reference.

BACKGROUND OF THE INVENTION

1. Field of the Invention

Embodiments of the invention described herein pertain to the field of aerial cable rail systems. More particularly, these embodiments enable the movement of objects within two-dimensional space.

2. Description of the Related Art

An aerial cable rail system is a system based on an elevated cable or line, along which objects are transported. Existing cable rail systems have relied on large fixed structures and/or complex control systems in order to facilitate the movement of objects. These systems fail to satisfactorily achieve the full spectrum of ease of control, compact storage, ease of transport, speed, load bearing, extensibility, maintainability and platform stability.

Any number of coordinate systems can be used in order to describe the path of an object as it moves through space. This document uses the terms Z-axis and Y-axis to denote vertical and horizontal directions respectively.

In U.S. Pat. No. 6,199,829 a device is described that follows a line. There is no mechanism for altering the Z-axis displacement of the mechanism moving along the line. The device is self propelled and is heavy.

In U.S. Pat. No. 5,113,768 a device for transporting a camera along a cable is described. The device must be secure enough to carry not only a camera but also a human photographer. The device is limited in the amount of Z-axis displacement that can be effected.

In U.S. Pat. No. 4,864,937 a point A to point B cable rail is described. The device possesses no means to descend in the Z-axis other than by placement of poles. The poles supporting the structure are placed at fixed heights in order to avoid objects on the ground.

In U.S. Pat. No. 6,145,679 a device is described that uses balloons to provide support for a highline. Items are transported along the highline. The balloons may be raised or lowered but are cumbersome in enclosed environments and stadiums where they would block the view of spectators. In addition, the speed at which items could be transported would be fairly slow since a balloon would have a large surface area and would not be capable of rapid horizontal movement.

In French Patent No. 992,069 a device is described which has no means for controlling the arc of travel of the supported object since all control is manual. In addition, no means for conveying messages or advertisements are contemplated and it appears that the device is intended for industrial operations where the stability of the supported object is of little concern.

SUMMARY OF INVENTION

One or more embodiments of the invention are directed to a mounting system configured to move objects throughout two-dimensional space by using a line (e.g., rope, cable or other mechanism) that is optionally reeved about a mounting beam and coupled with both opposing sides of a platform which may comprise the object to be moved. This line, which may be coupled with the mounting beam, controls both the Y-axis motion and Z-axis motion of the platform and is designated the YZ movement line. A buoyant embodiment may be configured by coupling the platform with a buoyant device (balloon for aerial based embodiments, or float for aquatic based embodiments, or ferromagnetic material for space based embodiments).

Displacing a portion of the YZ movement line via the Z-axis motor allows traversal of the Z-axis of the platform. Readers should note however that the actual path of traversal may curve be curved as will be explained further in the Detailed Description. Moving YZ movement line through the sheaves of the system via the Y-axis motor allows for traversal of the Y-axis of the platform (although like the Z-axis, the path of traversal may actually curve). Although computer control may be utilized, there is no need for a complex computer control system since over a coverage area serviced by the platform the Z-axis displacement is substantially independent of Y-axis movement and Y-axis displacement is substantially independent of Z-axis movement. This means that moving an object away from a given support structure can be accomplished by simply rotating the Y-axis motor although the object may minimally vertically displace in the middle of the path between the support structures to a lesser or greater extent depending upon the amount of line injected into the system via the Z movement device. This makes for trivial control when the amount of line in the system is set to follow the path of a stadium for example since the object may be configured to rise and follow the contour of the stadium without operator intervention (e.g., when the object is near each support structure). Vertical motion of the object is along the Z-axis when the amount of line to the object is the same from each support structure (i.e., when the object is in the middle of the coverage area) and slightly curved when near the support structures. Since the vertical component of motion is typically used in the middle and typically deepest part of the coverage area, no horizontal adjustments are typically necessary for this type of vertical motion. In other words, the Z-axis elements in the system control the upward and downward motion of the object although there may be some minimal but predictable horizontal motion, and the Y-axis elements in the system control the motion of the object between support structures although the object may experience some minimal but predictable vertical displacement during this movement.

In addition to trivial control and since it is possible to command the line from one point, distantly located motors and electrical cables are not required. Many types of useful objects may be attached to a mounting platform including devices that require external power or devices that possess their own power and are operated via wireless signals. By moving the platform, the object is therefore moved. The terms platform and object as used throughout this document are generally interchangeable. The term line as used herein is meant to include cables or any other suitable element for object suspension.

To ensure the platform follows a linear path in the Y direction without Z axis deviation, one or more embodiments of the invention contemplate the use of a computer control system. The control system takes into account the displacement of the platform from the support ends and adjusts the Z axis displacement during Y axis traversal. This allows the platform to travel in a straight line through three-dimensional space which may be important when using embodiments of the invention in locations that do not allow for an arced path.

Creating a two axis movement configuration from only one line driven from a point distantly located from the platform provides the advantages of allowing the motors to be large, power cables to be short and located near a large generator and optional control computer. Maintenance is readily performed in one location. The Z movement device in the system may also utilize a pulley arrangement that multiplies the Z-axis travel or may be constructed from levers, fulcrums, hydraulic or electronic actuators or any other device which can displace line.

It is feasible to configure the system to move objects along the Y and Z axes by using motors mounted at one support point, on or near the ground, to drive the lines. Embodiments of the invention use motors that connect to a generator, while other embodiments used in areas where power is readily available may use standard utility power. Generators used in embodiments of the invention can be as large as the application requires for achieving the required platform speed. The sheaves employed in the system may contain high speed bearings and are may be configured to capture the line in order to prevent derailing in order to add a degree of safety to the system. The drive pulleys attached to the motors comprise grooves that grip the line in order to prevent slippage. Any known means of driving line may be substituted for grooved pulleys.

For the purposes of this disclosure the use of the word motor signifies a motor connected to a drive pulley or drum winch. This assumption is made for purposes of illustration since it is well known in the art that the motor must drive any of a number of attachments to actually engage and move line.

The system can be scaled to any size by employing longer lines and moving the attachment points or support structures.

DETAILED DESCRIPTION

Embodiments of the invention are directed to a Mounting System Reeved to Move an Object in Two-Dimensions and Methods Relating to Same. In the following description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention.

The term line as used herein is also meant to refer to a cable or other flexible element that can be adapted for use as described herein. Moreover the use of the term path as related to Y-axis or Z-axis movement should not be limited to a linear path but may include a curved path. For example, elements of the system described as Z-axis or Y-axis related have as their primary control motion associated with their respective axis, although with curved paths, e.g., the Z movement device may actually introduce some Y-axis motion into the moved object and visa versa. Therefore although the terms Z-axis movement and Y-axis movement refer to moving an object primarily in the respective Z-axis and Y-axis, in reality the paths through space may be curved depending on where in the system the moved object is and under what type of movement it is undergoing. For example the Z-path of motion of the platform may be nearly identical to the direction of the Z-axis when the platform is equidistant between the two support structures. The path of the platform when asserting the Z movement device is slightly curved when the platform is near one of the support structures. The path between support structures may be very nearly linear when the amount of line in the system is set to provide the object with the highest possible height.

Figure 2:
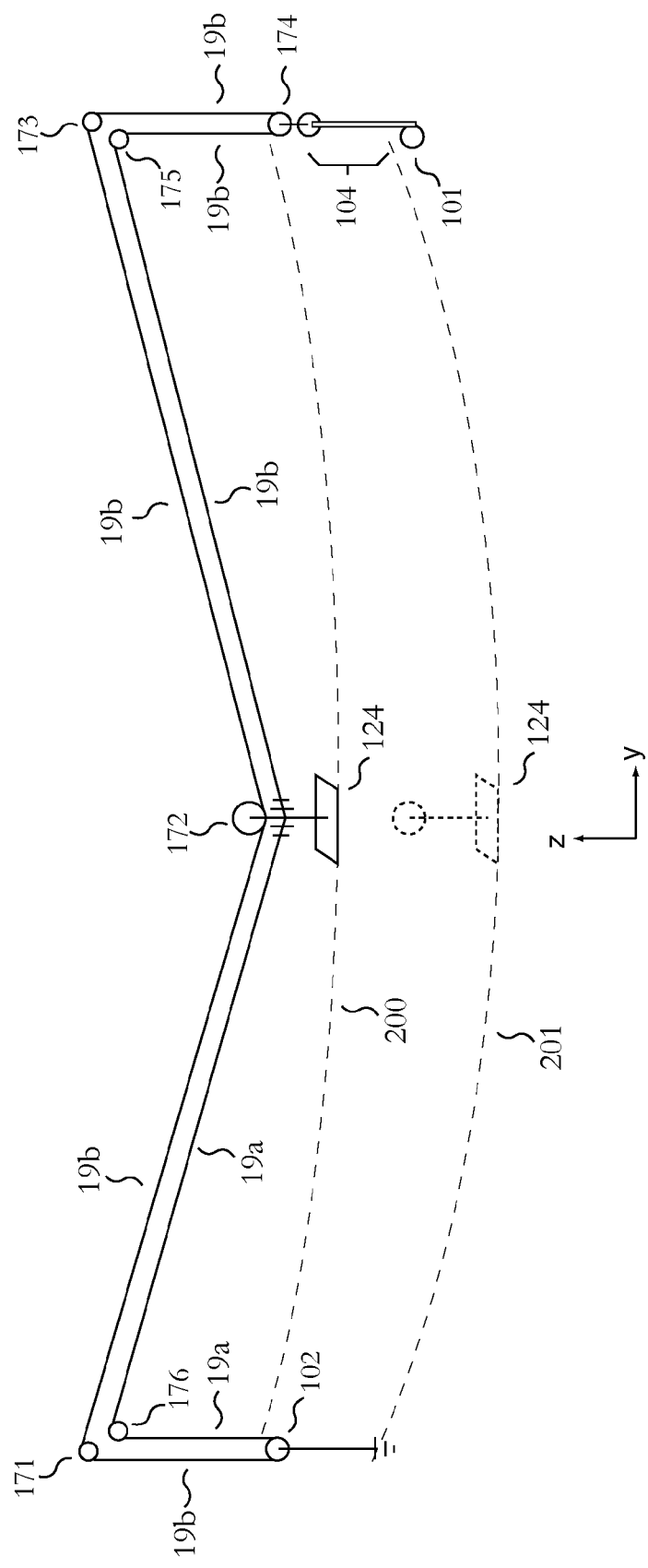
FIG. 2 is a YZ-axis reeving diagram for an embodiment of the invention employing distantly located winches for Y and Z-axis movement and shows two horizontal paths of motion depending on the height of the platform.

Any number of coordinate systems can be used in order to describe the path of an object as it moves through space. This document uses the terms Z-axis and Y-axis to denote vertical and horizontal directions respectively. The upward and downward path of an object moved by embodiments of the invention is not required to follow the exact vertical Z-axis and the path between support structures of an object may or may not follow the exact horizontal Y-axis as the object is moved when the amount of line in the system is kept constant. In general, on a first order approximation, for a given amount of line injected into the system, the path between support structures of an object being moved by embodiments of the invention is that portion of an ellipse lying beneath and between the support structures. With more line in the system, the path between support structures followed by an object becomes more circular or dipped in the middle. FIG. 2 shows this characteristic of the system. When the amount of line in the system keeps the platform on a line between the tops of the two support structures, then the path between the support structures is a very flat ellipse approximating a line. When the amount of line to an object is the same from each support structure, then the upward and downward path of an object follows the Z-axis if the heights of the two support structures are the same. Upward and downward motion of an object when the amount of line to an object from each support structure is greater on one side than the other does not follow a linear path parallel to the Z-axis but rather is curved down and toward the closest support structure. Even though the motion of the object moved by embodiments of the invention is not required to be linear, it is much simpler to describe the invention in terms of Z movement related elements and Y movement related elements since the primary component of movement for these elements is along the respective axis, albeit at times slightly curved.

Embodiments of the invention move objects through two-dimensions using one line. The line is coupled with opposing sides of a platform and either attaches to the platform or to a Z movement device. The line is driven by a motor and pulls the platform which may comprise an object from one side of the Y-axis to the other. The Z movement device displaces the line to or from the system in order to move the object primarily in the Z-axis. The Z movement device may be a lever, a screw-drive, block and tackle, or any other mechanism which can be configured to displace line. A motor driving the line may comprise a stepping motor or standard motor with a brake system in order to lock motion when the motor has stopped rotating. Any type of device that can move line can be used in place of a motor. There is no need for a complex computer control system since the Z-axis displacement is substantially independent of Y axis movement over a coverage area meaning that as the platform carrying the platform moves to the middle of the area of coverage in Y space, the Z-axis displacement is the deepest, see FIG. 2 path 200. As the platform moves towards a support structure, the Z-axis displacement is the highest. This gradual displacement in the middle of the coverage area makes embodiments well suited for various uses including but not limited to filming use, stadium use and strip mining use and provides a built in safety measure since the system naturally follows an elliptical path with foci centered at the support structures that can be as flat or circular as desired. In addition, by feeding line with the Z movement device into the Y-axis line, the platform can be moved horizontally while maintaining a constant Z-axis elevation. This can be accomplished manually or with a simple controller. In addition, since the lines may be commanded from one point, distantly located motors and electrical cables may be utilized but are not required. Many types of useful objects or devices may then be attached to the platform including devices that require external power or devices that possess their own power and are operated via wireless signals. For instance, it is possible to attach a camera or any other useful type of equipment to the platform.

Figure 1:
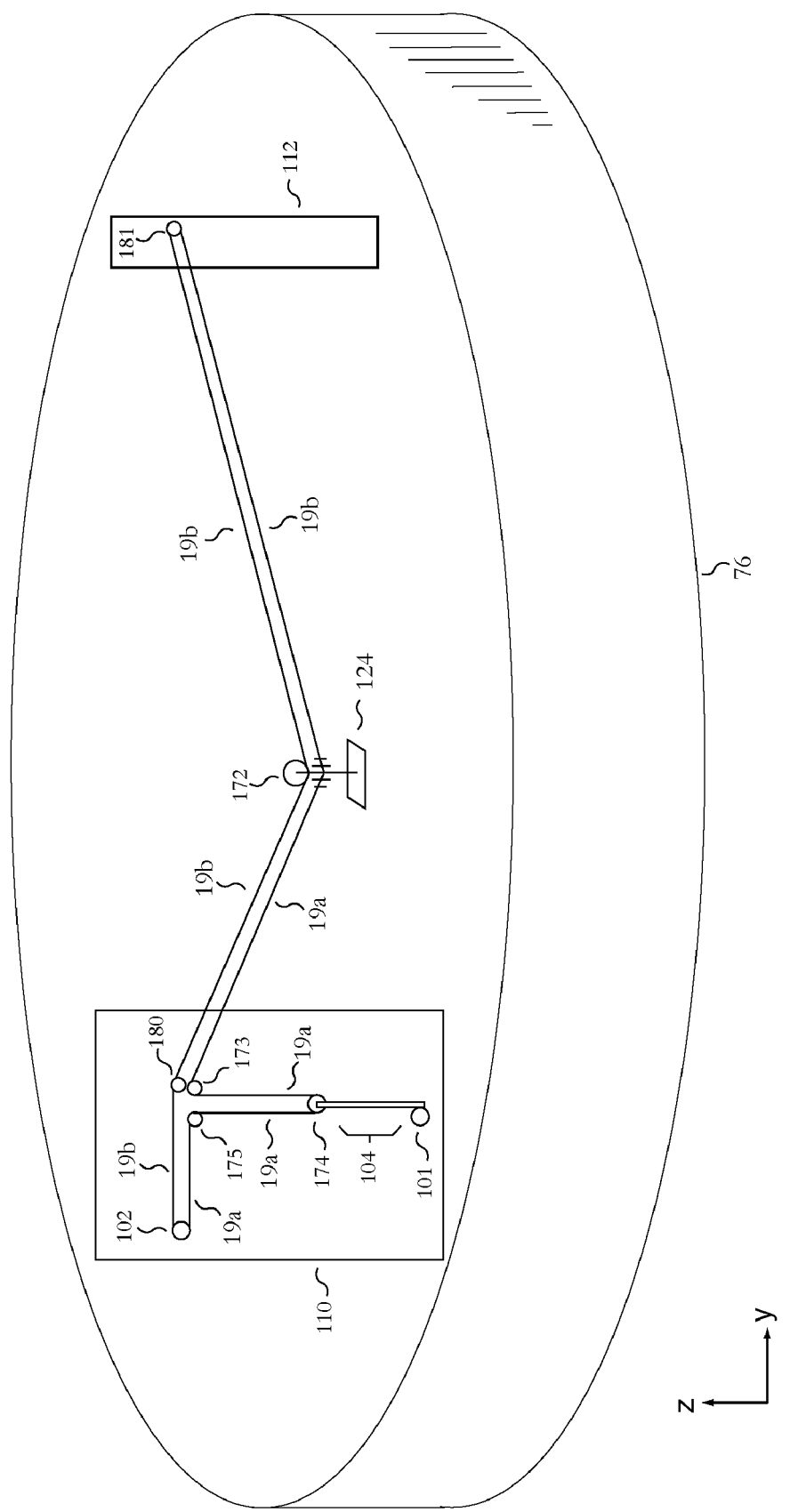
FIG. 1 shows a perspective view of an embodiment of the invention.

FIG. 1 shows a perspective view of an embodiment of the system. This embodiment is mounted in stadium 76. The two axes are shown in the figure with the Y-axis shown left to right and the Z-axis shown bottom to top of the page. In this configuration, support structures 110 and 112 separate platform 124 from the ground. Platform 124 provides a mobile attachment point for an object to be moved including but not limited to cameras, mining scoops, logging hooks, or any other utility enabling device applicable to any industry.

Platform 124 is supported and is moved in two dimensions by one line. The line forms a "V" shape when viewed from the perspective of FIG. 1. By decreasing the length of the line deployed into the system via Z-axis motor 101 and Z movement device 104, platform 124 is raised. Conversely, increasing the length of the line deployed, platform 124 is lowered. YZ movement line sides 19a and 19b are different sides of the same piece of line. Control of Y and Z-axis motors can be in the form of simple switches, potentiometers, or an optional but not required computer control system.

Z movement device 104 is coupled with YZ movement line side 19a. Sheave 172 rides on YZ movement line side 19b. By rotating Y-axis motor 102 (attached to a bull wheel that drives the line but is not shown for ease of viewing), thereby decreasing the amount of line on YZ movement line side 19a, which increases the amount of line on Y movement side 19b, the platform moves mainly in the negative Y direction, or to the left as shown in the figure.

Z movement device 104 can be any mechanism which can displace sheave 174 and is not required to be a line, but rather can be a screw drive, hydraulic system, fulcrum or any other device capable of moving sheave 174. Z movement motor 101 may be utilized to power any type of Z movement device desired. Y-axis motor 102 drive pulley is not shown for ease of illustration. Drive pulleys and drum winches are well known to those skilled in the art and embodiments that minimize line wear and provide anti-derailing features may be interchanged to drive the line in the system. Any device that can pull move line through it can be used in place of a drive pulley or bull wheel.

An embodiment of the invention can run fiber optics cables or power cables along YZ movement line side 19a or 19b from support structure 110 to platform 124. Support structure 112 can alternatively supply power to the platform in the same manner. Platform 124 may alternatively house devices with collocated power supplies negating the need for external power cables. Devices attached to platform 124 may include wireless or other remote controlled devices.

Note that Z movement device 104 can comprise a sequence of pulleys for multiplying the Z-axis traversal, and may also utilize a block or other device for disabling travel in case of breakage within Z movement device 104. By placing a backup means of limiting the upward travel of sheave 174, the platform can be configured to never reach the ground beneath it even if a failure at or beneath Z movement device 104 were to occur.

FIG. 2 shows a YZ-axis reeving diagram for an embodiment of the invention employing distantly located winches for Y and Z-axis movement and shows two horizontal paths of motion depending on the height of the platform. FIG. 2 shows path 200 that the platform travels when rotating Y-axis motor 102 without asserting Z movement device 104. Note that this elliptical path would be deeper and more circular as seen in FIG. 2 path 201 if more line was injected into the system via Z movement device 104. Note that even though the Y-axis motor rotation produces a path that slightly varies in Z-axis height, this displacement is minimal and therefore does not require a computerized control system or any control system for that matter. In this regard is the path were required to maintain a constant height in Z-axis direction over the course of travel, an operator could simply activate Z movement device 104 in order to inject a small amount of line into the system as platform 124 towards either support structure holding sheaves 171 and 173 for example. Alternatively, a control system could be employed in order to do this automatically, but is in no way required. For embodiments of the invention used in areas where Z displacement minimization during Y traversal is required, the control system may utilize Y displacement to calculate the amount of Z movement required to keep a level platform path. Since the supporting endpoints form the foci of a two-dimensional ellipse, measurements of amount of line deployed on each side of the supports determines the location of the platform on the ellipse. Since the measurements determine the Z height, the amount of deployed line can be adjusted by the Z-axis motor while the Y-axis motor is moving the platform in order to raise the platform as it approaches the mid-point of between the supports in order to compensate for the dip in the elliptical path. As the equation for an ellipse is known, an iterative loop which activates the Z-axis motor until an acceptable error is achieved is one possible control algorithm that will yield a constant Z height during Y traversal. Any other algorithm that would keep the platform traveling in a desired path whether linear or not is in keeping with the spirit of the invention.

Y movement in the positive Y direction, to the right in the figure, is accomplished by rotating Y-axis motor 102 counter-clockwise in the diagram. As Y-axis motor 102 rotates counter-clockwise, line side 19b moves down from sheave 171 that is coupled with support structure 110 (not shown for ease of illustration) and from sheaves 172, 173, 174, 175. This pulls platform 124 to the right in the figure, in the positive Y-axis. As line side 19b travels away from Y-axis motor 102, line side 19a heads up to sheave 176 and to platform 124. The one line in the invention is designated with two reference characters 19a and 19b to signify which side of the platform the line is connected to. The arbitrary dividing point for the designation is at Y-axis motor 102. Note that sheaves 171, 176, 173 and 175 may be eliminated in embodiments of the invention that utilize motors mounted in supports 110 and/or 112. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Retracting Z movement device 104 raises platform 124 primarily in the vertical direction and visa versa. As Z movement device 104 extends, YZ movement line side 19b moves upward into sheaves 173 and 175 that are coupled with support structure 112 (again not shown for ease of illustration). Since both sides of platform 124 have increased line length, the platform lowers. Motion of the Z movement device in the opposite direction raises the platform.

Figure 3:
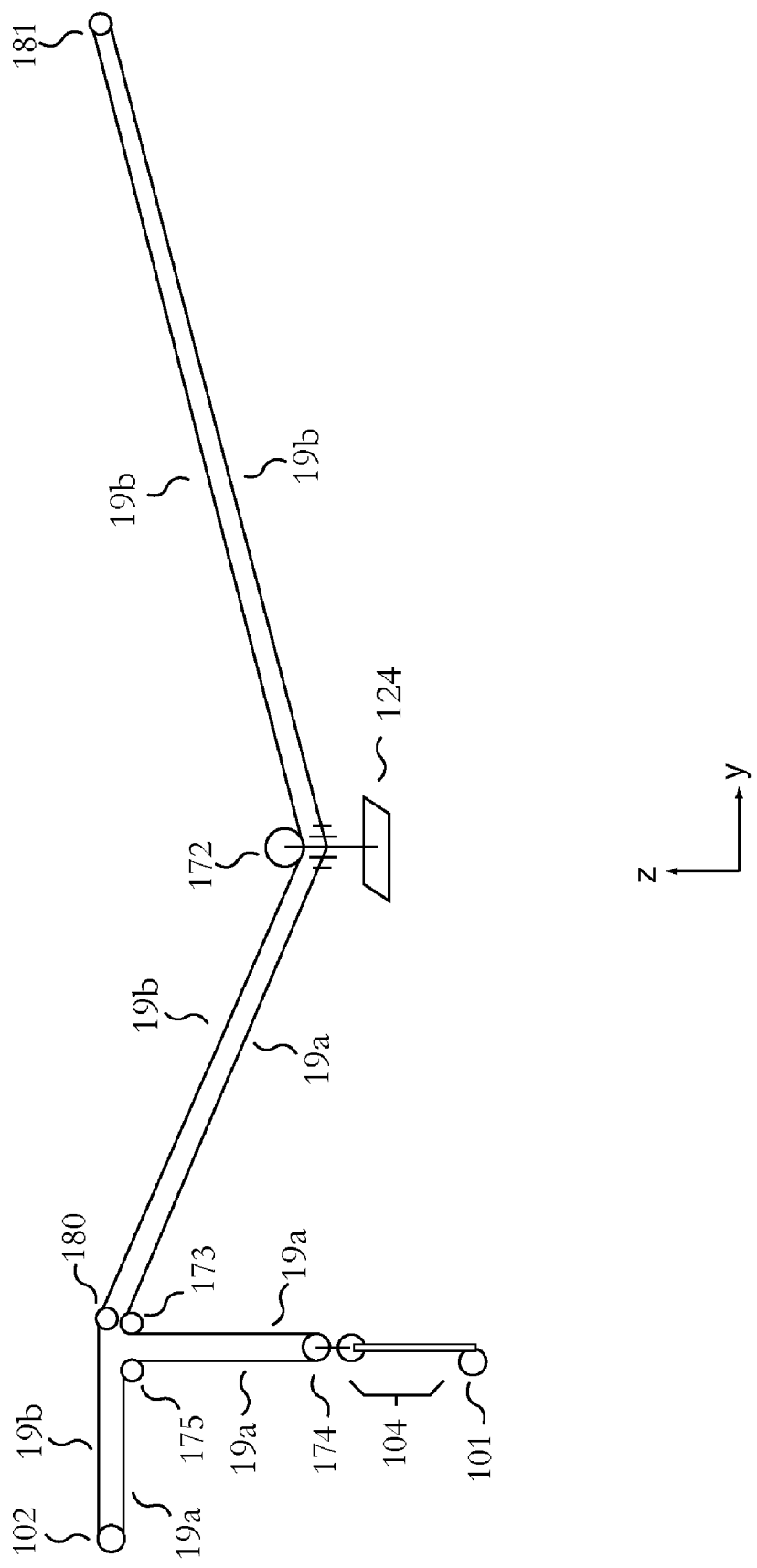
FIG. 3 is a YZ-axis reeving diagram for an embodiment of the invention employing Y and Z-axis movement devices on the same side of the invention.

FIG. 3 shows a YZ-axis reeving diagram for an embodiment of the invention employing Y and Z-axis movement devices on the same side of the invention. Y movement in the positive Y direction, to the right in the figure, is accomplished by rotating Y-axis motor 102 counter-clockwise in the diagram. As Y-axis motor 102 rotates counter-clockwise, line side 19b moves into Y-axis bull wheel (not shown for ease of illustration) through sheaves 180, 172, 181. This pulls platform 124 to the right in the figure, in the positive Y-axis. As line side 19a travels out of Y-axis motor 102, line side 19a heads to sheave 175, 174, 173 and then to platform 124. The single line in the system is designated with two reference characters 19a and 19b to signify which side of the platform the line is connected to. The arbitrary dividing point for the designation is at Y-axis motor 102. Note that sheave 180 may be eliminated in embodiments of the invention that utilize a Y-axis motor mounted in high enough in support 110 (not shown for ease of illustration) to clear sheaves 173 and 175. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Retracting Z movement device 104 raises platform 124 primarily in the vertical direction and visa versa. As Z movement device 104 extends, YZ movement line side 19a moves upward into sheave 173. The line does not move into sheave 175 since the next span is to Y-axis motor 102 which is not a free rotating sheave. As line moves to platform 124 from sheave 173, downward force from platform 124 on sheave 172 pulls line side 19b from platform 124 into sheave 181 and through sheave 172. Since both sides of platform 124 have increased line length, the platform lowers. Motion of the Z movement device in the opposite direction raises the platform.

Figure 4:
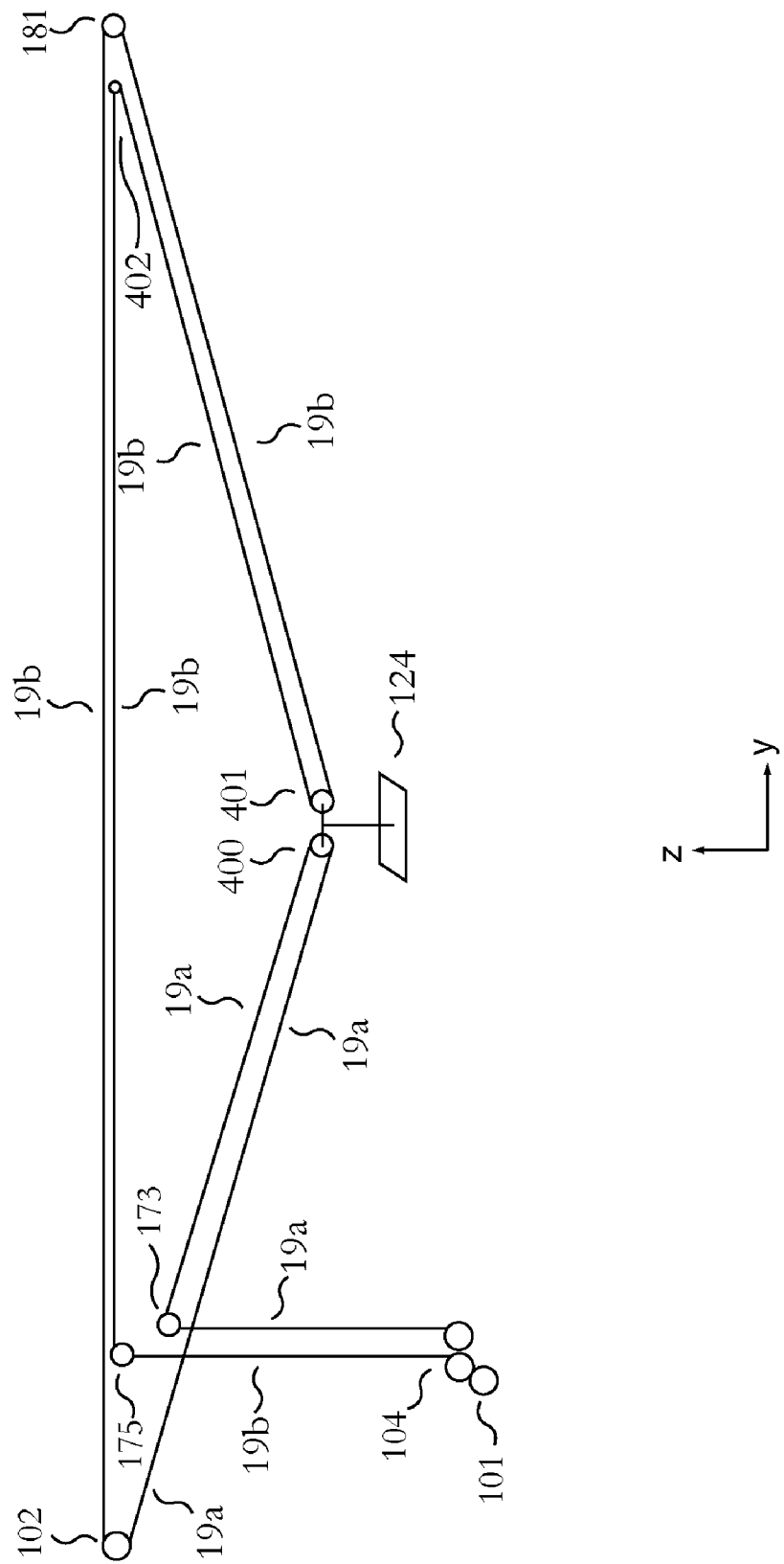
FIG. 4 shows the YZ-axis reeving diagram for an embodiment of the invention employing line that is configured with attachment point at Z movement device as opposed to attachment at the platform.

FIG. 4 shows a YZ-axis reeving diagram for an embodiment of the invention employing line that is configured with attachment point at Z movement device as opposed to attachment at the platform. Y movement in the positive Y direction, to the right in the figure, is accomplished by rotating Y-axis motor 102 counter-clockwise in the diagram. As Y-axis motor 102 rotates counter-clockwise, line side 19b moves into Y-axis bull wheel (not shown for ease of illustration) coupled with Y-axis motor 102 through sheaves 181, 401, 402, 175. As line side 19b leaves Y-axis bull wheel attached to Y-axis motor 102, it becomes designated line side 19a. Line side 19a travels into sheave 400 to sheave 173. This motion of the single line in the system pulls platform 124 to the right in the figure, in the positive Y-axis. The arbitrary dividing point for the designation change from 19a to 19b on the two sides of the line is at the Y-axis motor and runs on each side of that dividing point to the endpoints of the line at Z movement device 104. Z movement device 104 in this embodiment is a two wheel winch, however any device can be used that is configured to deploy and remove lengths of line sides 19a and 19b into the system. One skilled in the art will recognize that some sheaves may be moved or eliminated while keeping with the spirit of the invention. Reversing the direction of Y-axis motor 102 pulls platform 124 in the negative Y-axis direction, to the left in the diagram.

Rotating Z-axis motor 101 which in turn rotates this embodiment of Z movement device 104 (here a two wheel winch), causes an increase the length of deployed line in the system on line sides 19a and 19b lowers the platform in the Z-axis direction. As Z movement device 104 rotates in one direction, YZ movement lines 19a and 19b move upward into sheave 173 and 175 respectively. Sheaves 173 and 175 may be coupled with support structure 110 (not shown for simplicity). As line moves to platform 124 from sheave 173 into sheave 400, and from sheave 175 to sheave 402 and into sheave 401, both sides of platform 124 have increased line length, and hence the platform lowers. Operating the Z movement device in the opposite direction raises the platform.

Figure 5:
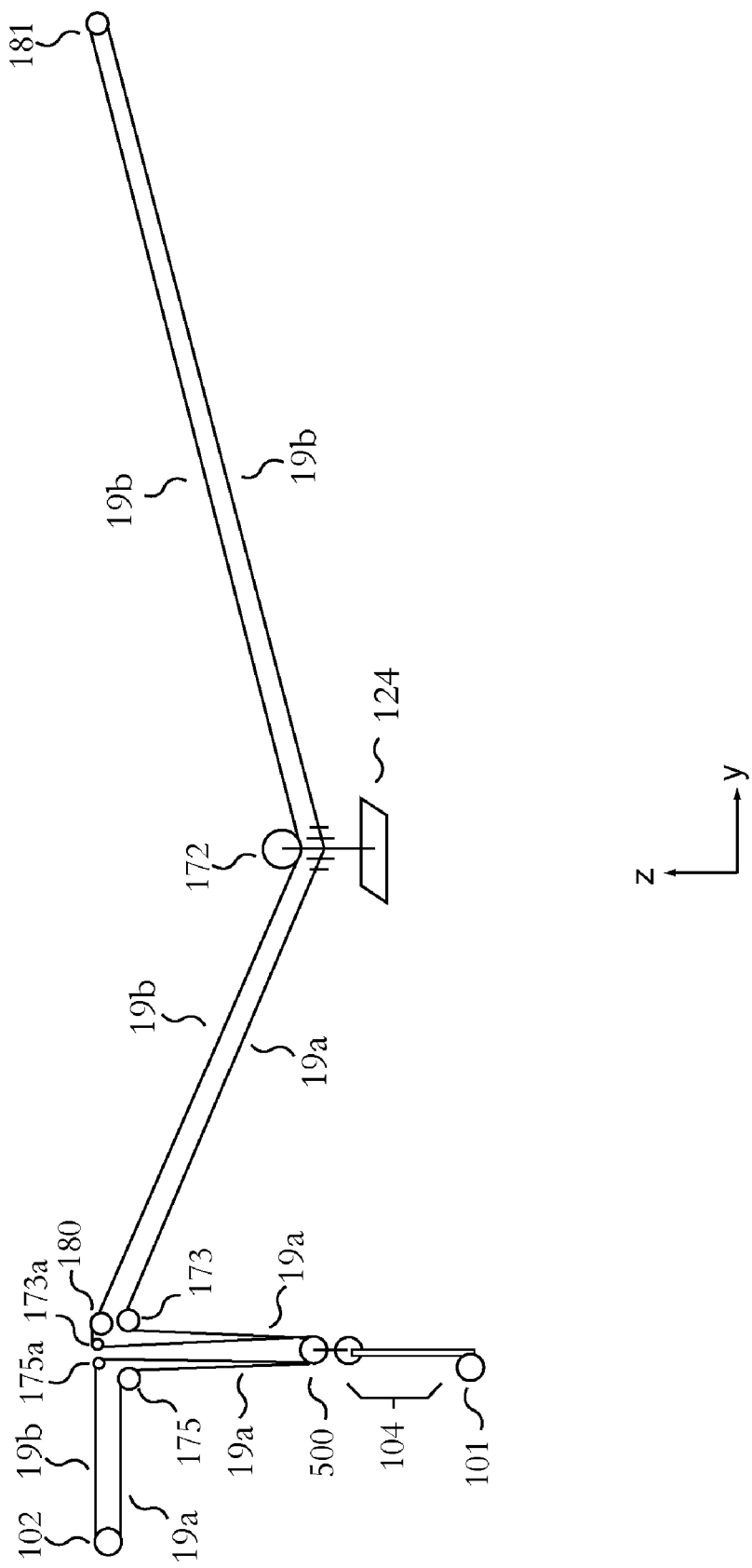
FIG. 5 is a YZ-axis reeving diagram for an embodiment of the invention employing dual Z-axis displacement.

FIG. 5 shows the YZ-axis reeving diagram for an embodiment of the invention employing dual Z-axis displacement devices. Y movement in the positive Y direction, to the right in the figure, is accomplished by rotating Y-axis motor 102 counter-clockwise in the diagram. The difference between this embodiment and the embodiment shown in FIG. 3 is 175a and 173a which operate on line side 19b exactly in the same manner as sheaves 175 and 173 operate on line side 19a. In addition, sheave 500 may be a double sheave comprising two separate sheaves. As Y-axis motor 102 rotates counter-clockwise, line side 19b moves into Y-axis bull wheel attached to Y-axis motor 102 through sheaves 175a, 500 (first sheave), 173a, 180, 172 and 181. This pulls platform 124 to the right in the figure, in the positive Y-axis. As line side 19a travels out of Y-axis motor 102, line side 19a heads to sheave 175, 500 (second sheave), 173 and then to platform 124 where the termination is shown as broken vertical lines (also shown in the close up view in FIG. 6, terminators 600). The one line is designated with two reference characters 19a and 19b to signify which side of the platform the line is connected to. The arbitrary dividing point for the designation is at Y-axis motor 102. Note that sheave 180 may be eliminated in embodiments of the invention that utilize a Y-axis motor mounted in high enough in support 110 to clear sheaves 173, 173a, 175 and 175a. Support 110 may house all sheaves to the left of platform 124 in the figure, but is not shown for ease of viewing. One skilled in the art will recognize that other sheaves may be moved or eliminated while keeping with the spirit of the invention. Reversing the direction of Y-axis motor 102 pulls platform 124 in the negative Y-axis direction, to the left in the diagram.

Extending Z movement device 104 vertically increases the length of deployed line in YZ movement line side 19a and 19b. This lowers the platform in the Z-axis direction. As Z movement device 104 increases in length, for example in the case of a screw block where a large screw rotates which unwinds a threaded block causing the block to rise, YZ movement line side 19a moves upward into sheave 173 while at the same time line side 19b moves upward into sheave 173a. The line does not move into sheave 175 or 175a since the next span is to Y-axis motor 102 which is not a free rotating sheave. As line moves to platform 124 from sheave 173, and 173a and 180, the platform lowers. Motion of the Z movement device in the opposite direction raises the platform.

Embodiments of the invention may comprise support structure 110 and 112 which may or may not comprise two sheaves each. Stadiums may contain support points, poles or other structures which may eliminate the need for separate support structures 110 and 112. More sheaves may be added to embodiments of the invention that require routing of line through obstacles. Any of the sheaves utilized in the system may comprise any device that can guide the line into the sheave securely.

Figure 6:
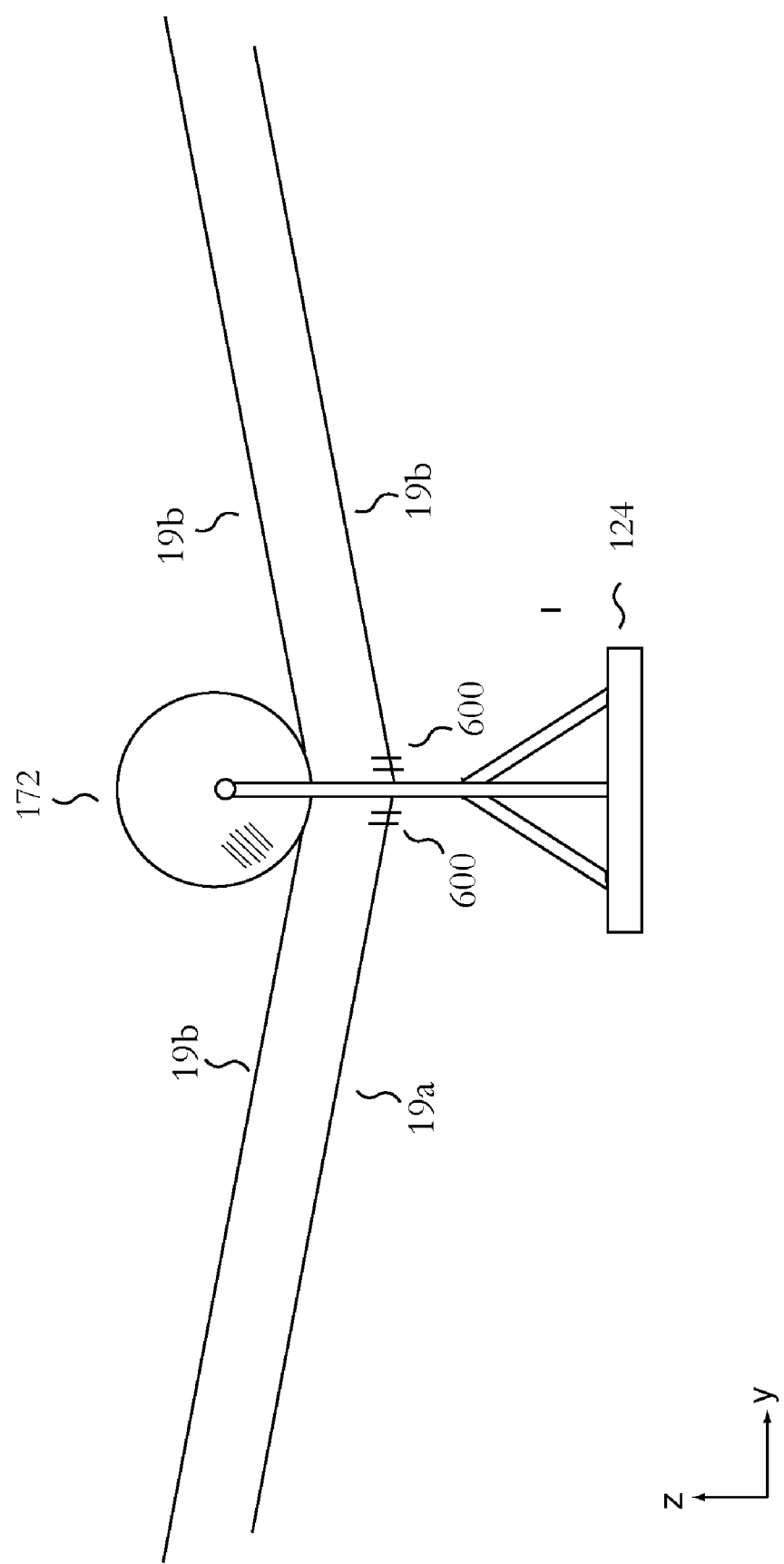
FIG. 6 is a perspective view of an embodiment of the platform.

FIG. 6 shows close up perspective of platform 124 in one embodiment of the invention. This embodiment of the platform is suspended from line side 19b via sheave 172. Any useful object or device may be mounted on the platform. Terminators 600 connect the line ends to the platform.

FIG. 1 shows an embodiment of the invention that uses single sheaves at all line direction points. Other embodiments may use multiple sheave arrangements virtually anywhere where a single sheave is used in order to change direction of a line and further prevent derailing. Sheaves with groove shapes and rounded edges that minimize the lateral friction on lines passing through the sheaves may be utilized in order to minimize the amount of wasted power in the system. Embodiments of the invention may use any type of sheave that works with the line specified for the system. Any linear connection device may be utilized in place of line, such as but not limited to cable. A dynamometer may be inserted in-line between Z-axis motor 101 and Z movement device 104 in order to provide tension readings.

An embodiment of the invention comprises a simple block and tackle utilized with the Z movement device 104. A block and tackle may be utilized in order to provide a Z-axis N-factor multiplier. Block and tackle assemblies are well known in the art and could readily be applied between Z movement device 104 and sheaves 173 and 175 in FIG. 3 in order to multiply the amount of line injected into the system per unit of extension of Z movement device.

Figure 7:
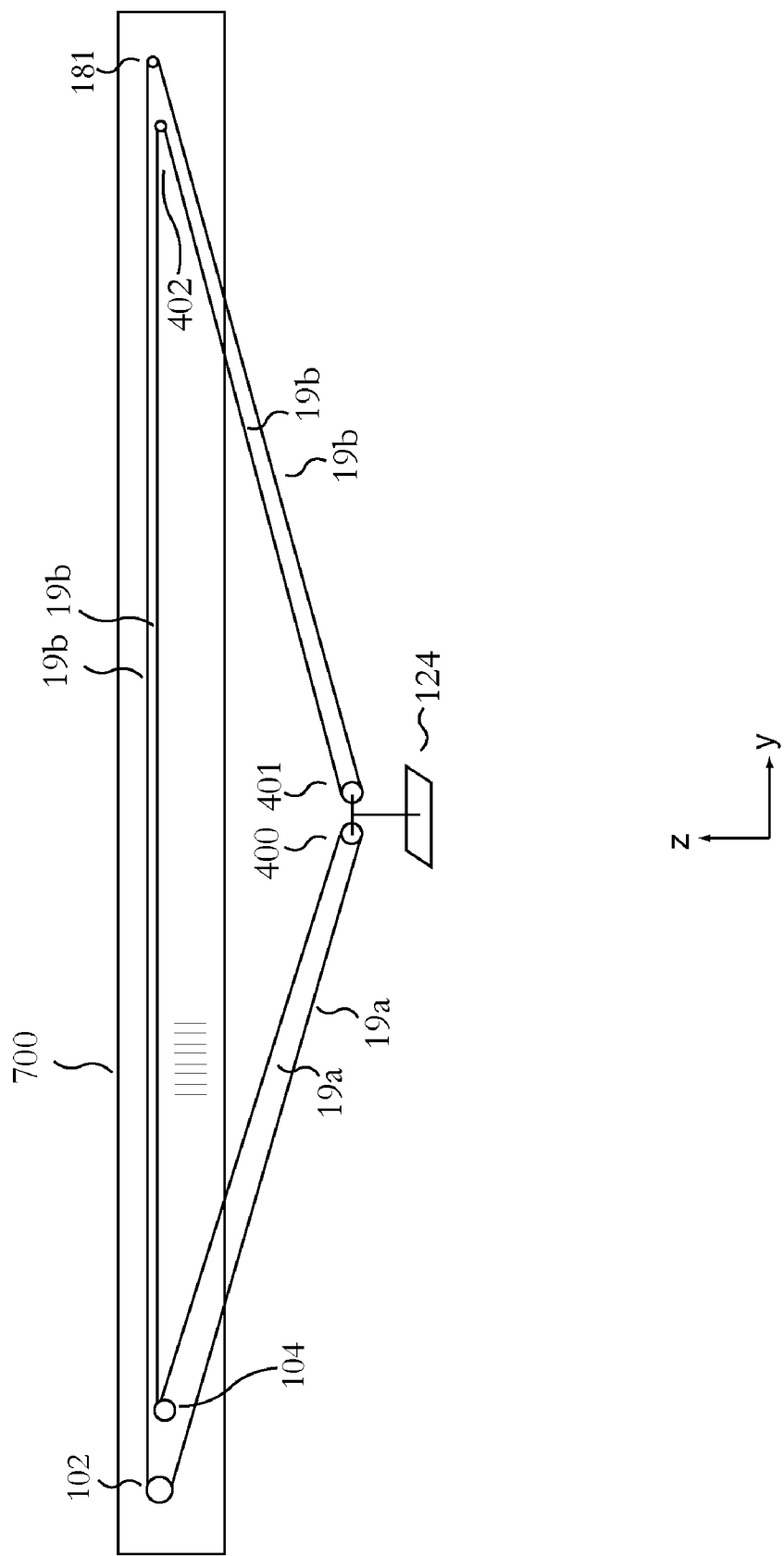
FIG. 7 is a side view of the interior of an embodiment of the invention comprising a mounting beam.

FIG. 7 is a side view of the interior of an embodiment of the invention comprising a mounting beam. Mounting beam 700 is used as a mount for sheaves 181 and 402 and Y-axis motor 102 and associated bull wheel and Z-axis motor 104 and associated reel(s). The line in the system is coupled at Z movement device 104. Y movement in the positive Y direction, to the right in the figure, is accomplished by rotating Y-axis motor 102 counter-clockwise in the diagram. As Y-axis motor 102 rotates counter-clockwise, line side 19b moves into Y-axis bull wheel (not shown for ease of illustration) coupled with Y-axis motor 102. As line side 19b leaves Y-axis bull wheel attached to Y-axis motor 102, line side 19b becomes designated line side 19a although both lines are the same contiguous piece of line that is merely redirected at the bull wheel. Line side 19a travels into sheave 400. As Y-axis motor 102 rotates counterclockwise, line side 19b moves around sheave 181 from sheave 401. Since Z-axis motor 104 is not required to move the motion of the Y-axis is substantially independent of motion in the Z-axis meaning that the main component of motion in the system in the Y-axis is generally accomplished via the Z-axis motor and conversely the main manipulator of Z-axis motion is the Z-axis motor generally speaking. This counterclockwise motion of the single line in the system about the bull wheel attached to Y-axis motor 102 pulls platform 124 to the right in the figure, in the positive Y-axis. The arbitrary dividing point for the designation change from 19a to 19b on the two sides of the line is at Y-axis motor 102 and runs on each side of that dividing point to the endpoints of the line at Z movement device 104. Z movement device 104 in this embodiment is a two wheel winch, however any device can be used that is configured to deploy and remove lengths of line sides 19a and 19b into the system. One skilled in the art will recognize that some sheaves (e.g., pulleys) may be moved or eliminated while keeping with the spirit of the invention. Reversing the direction of Y-axis motor 102 pulls platform 124 in the negative Y-axis direction, to the left in the diagram.

Rotating Z-axis motor 101 which in turn rotates this embodiment of Z movement device 104 (here for example a two wheel winch), causes an increase in the span of deployed line sides 19a and 19b. Such increases lower the platform in the Z-axis direction. As Z movement device 104 rotates in the counterclockwise direction, line sides 19a and 19b move are reeled into the winch (or two wheel winch not shown for brevity) attached to Z-axis motor 104 from sheaves 400 and 402 via 401. Rotation of Z-axis motor in the opposite direction conversely lowers the platform.

Figure 8:
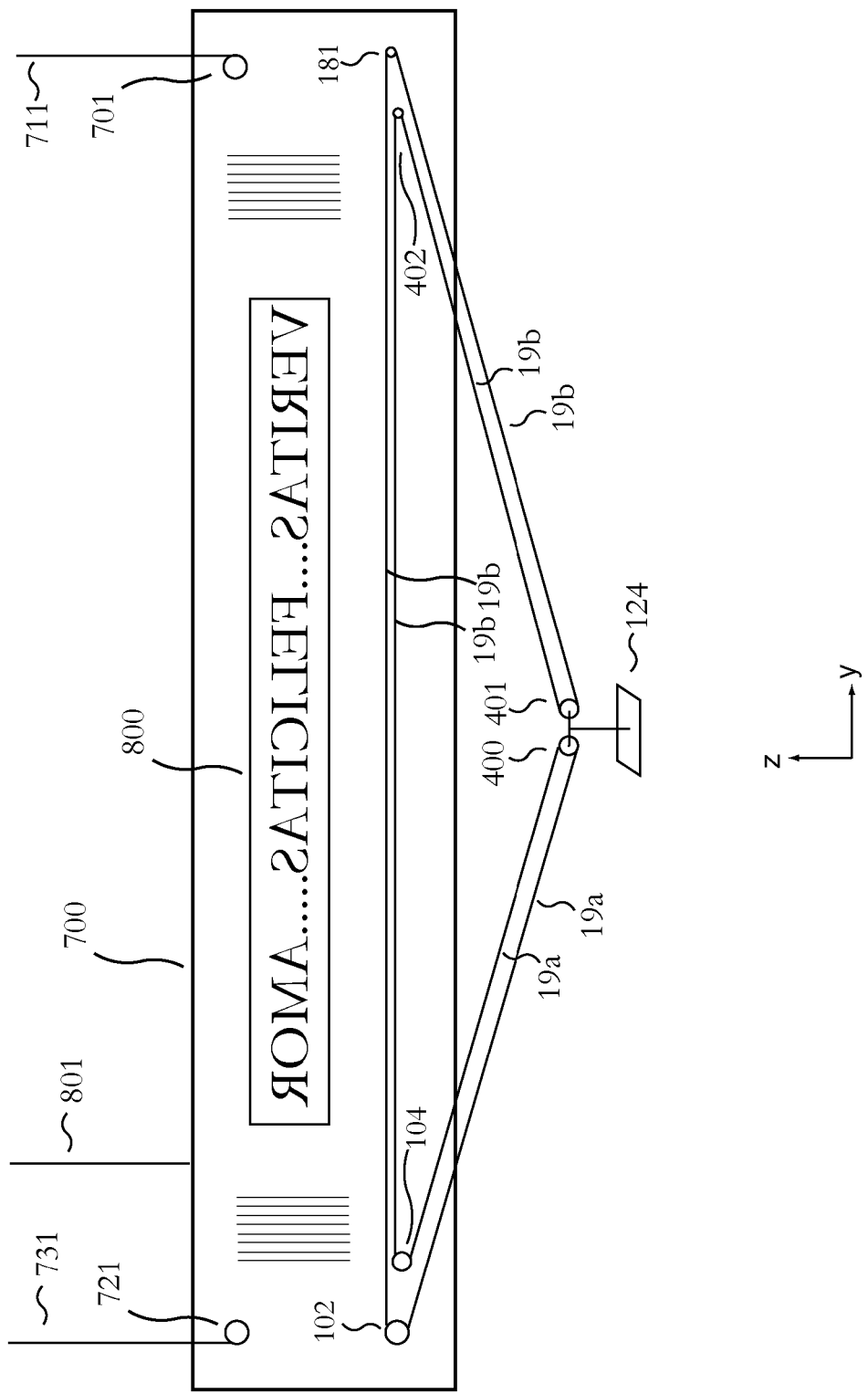
FIG. 8 is a side view of the interior of an embodiment of the invention comprising a mounting beam and visual display element and supporting and communications lines.

FIG. 8 is a side view of the interior of an embodiment of the invention comprising a mounting beam and visual display element and supporting and communications lines. A panel on the front of this embodiment may comprise a visual display element. Examples of things considered visual display elements include, but are not limited to, advertisements, text messages, images, videos, or any other visible data. Such visual display elements may be communicated to mounting beam via an interconnection fabric such as a network (wireless or otherwise). Communications line 801 may also comprise power lines although the batteries may also be supported by or between front and rear panels. Support lines 711 and 731 may couple with winches 701 and 721 respectively, or the lines may directly attach to mounting beam 700 with winches mounted above in a preexisting structure. Rotation of winches 701 and 721 may be simultaneous or may be independent for various effects such as a wave like pattern performed after for example a hockey goal is scored. Use of one winch 701 is accomplished by removing winch 721 and replacing it with a sheave the runs line 731 to winch 701. A single winch can be mounted above the beam with two drums that would be capable of raising mounting beam 700 the same amount on both sides simultaneously. Use of one line is possible for embodiments of the invention that have a low enough center of gravity. Visual display element 800 (shown from behind as mount on rear portion of mounting beam 700) may comprise a flat panel screen, a dot matrix readout, speakers, fog machines or any other device used to communicate visual display elements. Although shown in rectangular format, mounting beam 700 may take any shape. Communications line 801 may be used to send messages (e.g., visual display elements) to visual display element 800, or the messages may be sent via wireless communications. In addition, control signals for Z-axis motor 104 and Y-axis motor 102 may be sent over communications line 801 or via wireless signals as well. Any camera mounted on platform 124 may output signals over communications line 801 or via wireless means.

Figure 9:
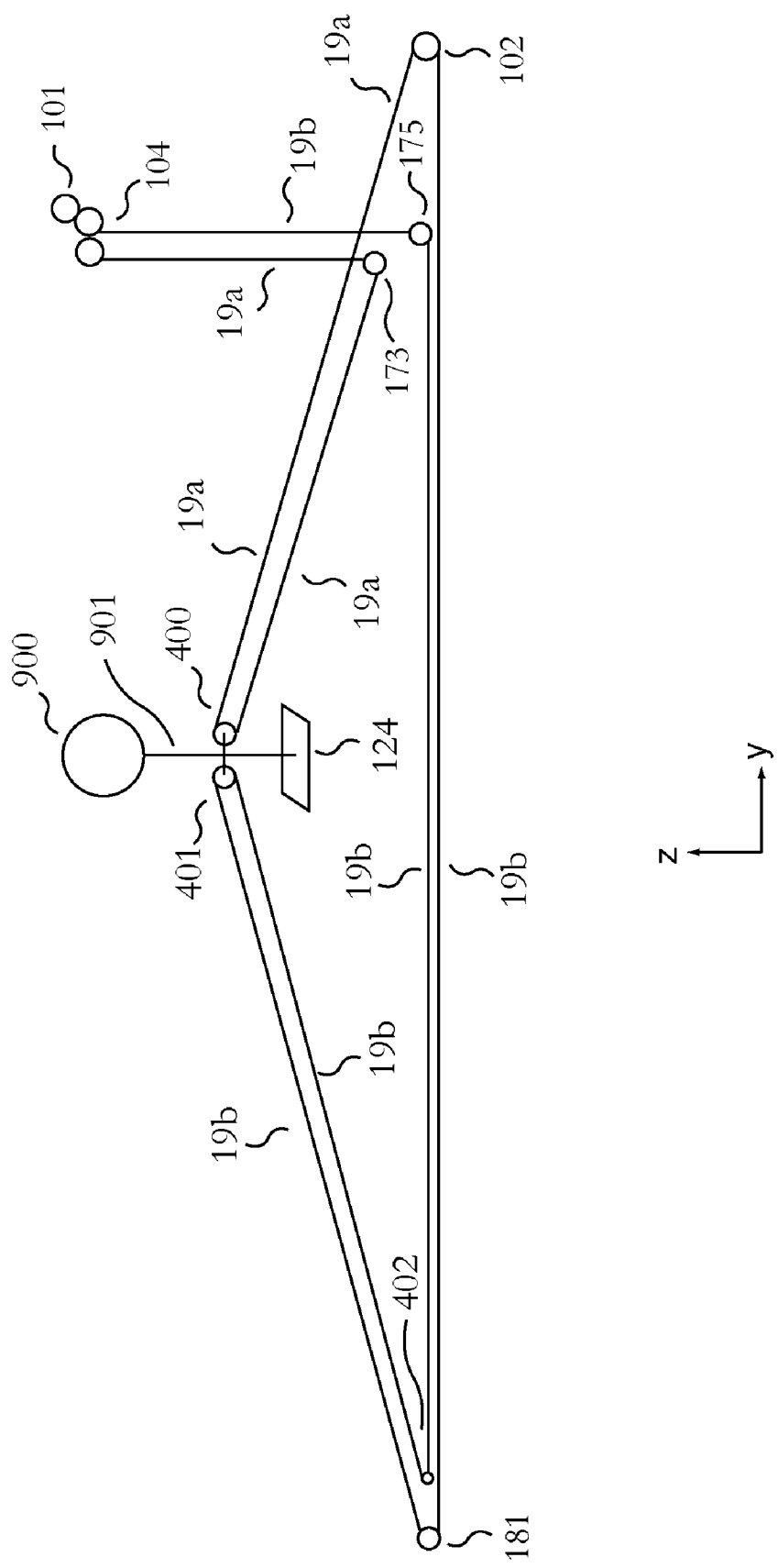
FIG. 9 is a YZ-axis reeving diagram for a buoyant embodiment of the invention.
Figure 10:
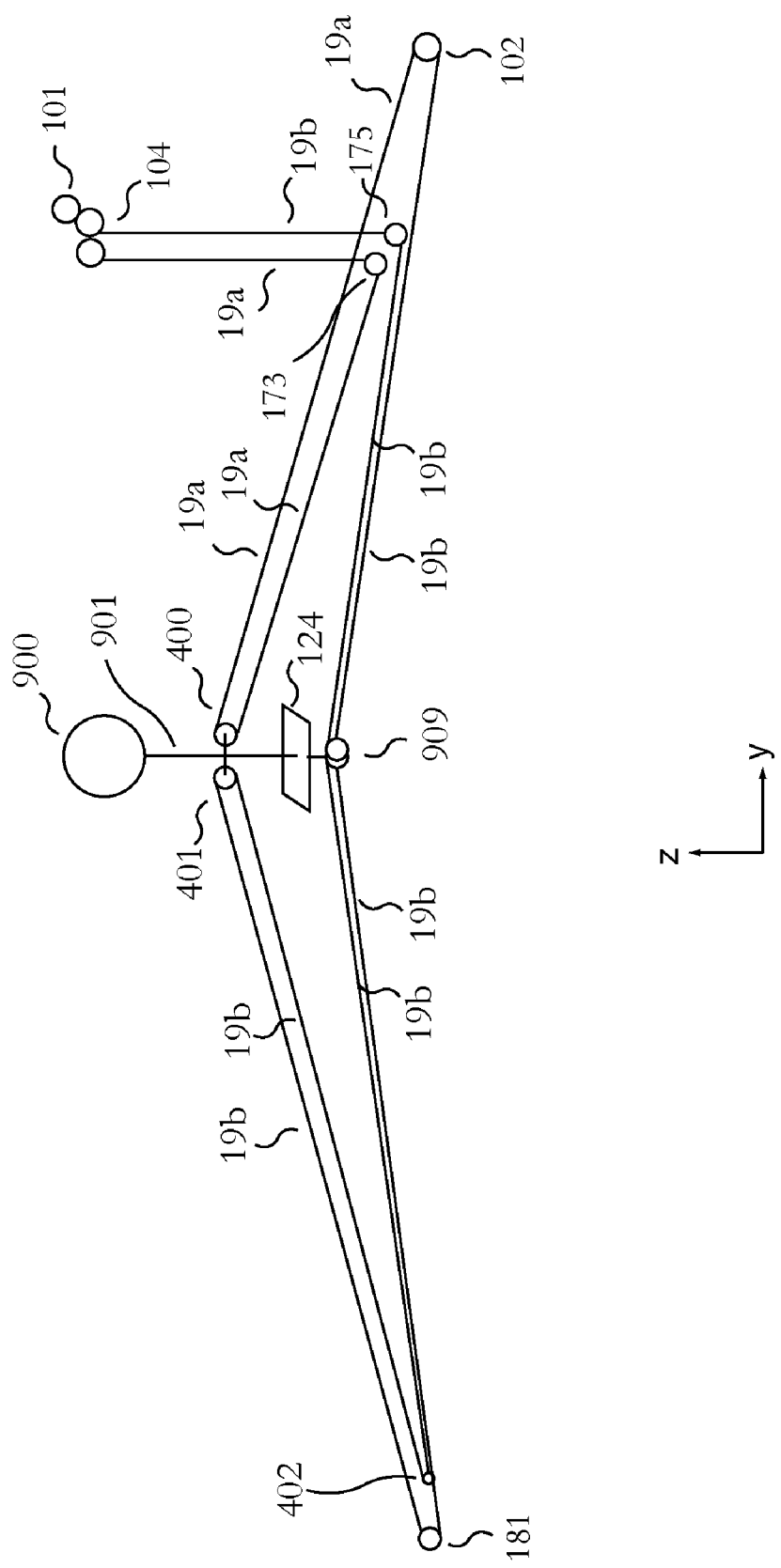
FIG. 10 is an alternate reeving of FIG. 10 with redirection sheaves redirecting line over the area below.
Figure 11:
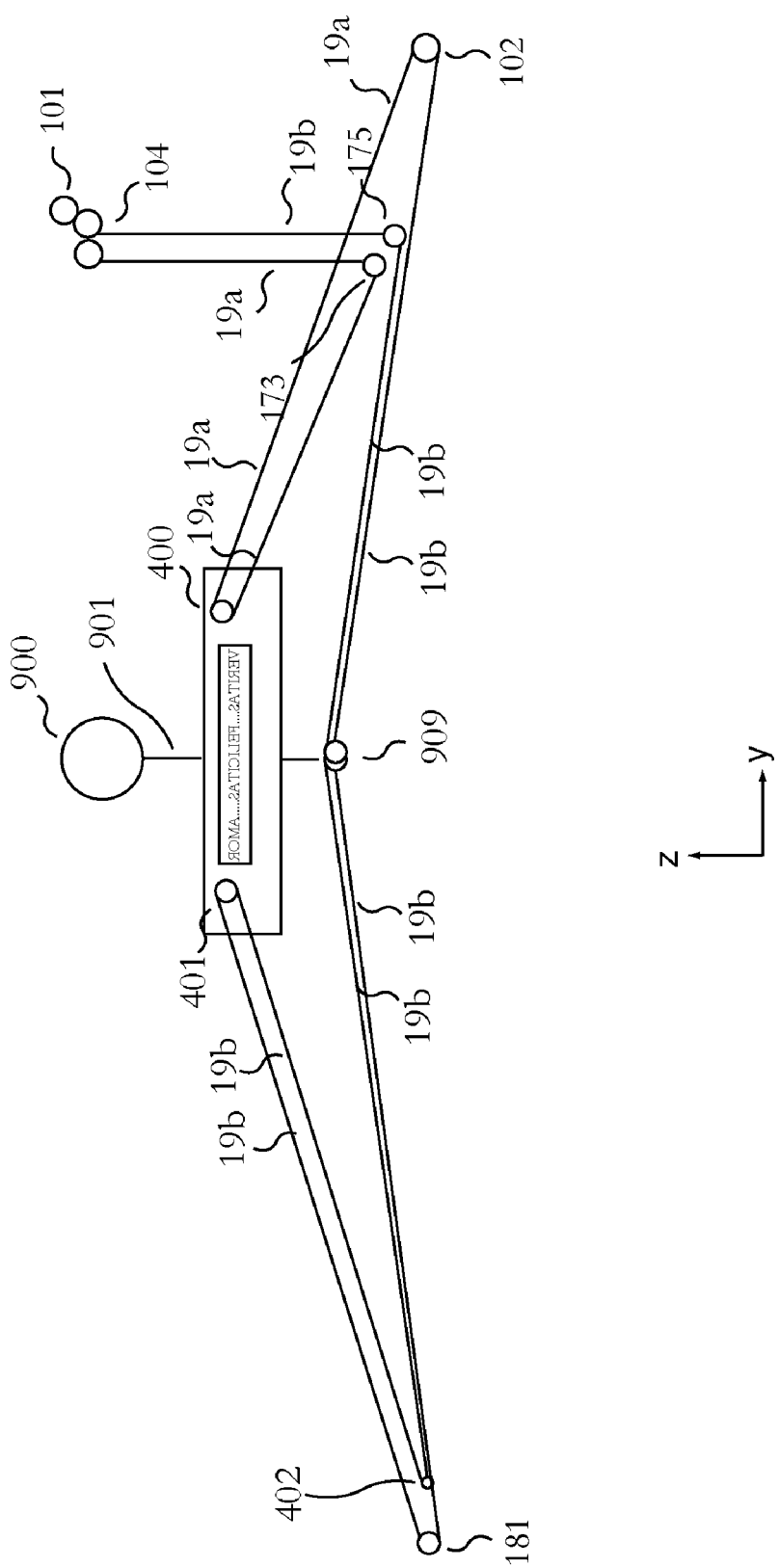
FIG. 11 shows an embodiment having a visual display element and/or beam replacing the connective element between the sheaves of FIG. 10.

FIG. 9 is a YZ-axis reeving diagram for a buoyant embodiment of the invention. This buoyant embodiment may be utilized with alternate reeving through redirection sheaves coupled with the platform if there is no direct path between Y-axis motor 102 and sheave 181. This alternate reeving is shown in FIG. 10 with redirection sheaves 909 redirecting line over the area below. The connective element between sheaves 400 and 401 may be replaced by a visual display element and/or beam which is shown in FIG. 11. Coupling Y-axis motor 102 and Z-axis motor 101 may comprise direct mounting in the beam or indirect mounting on the ground.

Platform 124 can have many different apparatus attached to it to perform a variety of functions including but not limited to buoyant elements, stabilization devices, gimbals, camera equipment, mining loaders, ship-to-ship loaders, logging devices, ski lift seats, gondolas, body sensing flight simulator suits for allowing a person to simulate flying, reduced gravity simulator suits, lifting harnesses, munitions depot bomb retrievers, digital video equipment for security checks in railroad yards or nuclear facilities, robotic agricultural harvest pickers for quickly picking and storing grapes or other produce or any other device that benefits from repeatable placement and motion in two dimensional space. In another embodiment, platform 124 comprises a witness camera mounted pointing down from the platform, providing a picture from the viewpoint of the platform.

What is claimed is:

1. A system comprising:
a platform supported by two freely rotating sheaves each coupled to opposing sides of said platform;
a YZ movement line configured to move said platform by increasing a portion of said YZ movement line on one side of said platform;
a mounting beam from which said platform is supported by two sheaves coupled with said mounting beam wherein said YZ movement line connects a first freely rotating sheave on a first side of said platform to a first sheave selected from said two sheaves on a first side of said mounting beam and an opposing side of said YZ movement line connects a second freely rotating sheave on a second side of said platform to a second sheave selected from said two sheaves on a second side of said mounting beam;
a Y movement motor mounted on said mounting beam and said YZ movement line;
a Z movement motor mounted on said mounting beam said YZ movement line.

2. A method comprising:
coupling a YZ movement line with two freely rotating sheaves each coupled to opposing sides of a platform;
coupling said YZ movement line with a mounting beam from which said platform is supported by two sheaves coupled with said mounting beam wherein said YZ movement line connects a first freely rotating sheave on a first side of said platform to a first sheave selected from said two sheaves on a first side of said mounting beam and an opposing side of said YZ movement line connects a second freely rotating sheave on a second side of said platform to a second sheave selected from said two sheaves on a second side of said mounting beam;
coupling said YZ movement line with a Y movement motor wherein said Y movement motor is mounted on said mounting beam;
coupling said YZ movement line with a Z movement motor wherein said Z movement motor is mounted on said mounting beam; and;
moving said platform by increasing a portion of said YZ movement line on one side of said platform.

3. The method according to claim 2 further comprising:
coupling said mounting beam to a winch;
coupling said winch to a support line;
rotating said winch; and,
moving said mounting beam.

4. A method comprising:
means for coupling a YZ movement line with two freely rotating sheaves each coupled to opposing sides of a platform;
means for coupling said YZ movement line with a mounting beam from which said platform is supported by two sheaves coupled with said mounting beam wherein said YZ movement line connects a first freely rotating sheave on a first side of said platform to a first sheave selected from said two sheaves on a first side of said mounting beam and an opposing side of said YZ movement line connects a second freely rotating sheave on a second side of said platform to a second sheave selected from said two sheaves on a second side of said mounting beam;
means for coupling said YZ movement line with a Y movement motor wherein said Y movement motor is mounted on said mounting beam;
means for coupling said YZ movement line with a Z movement motor wherein said Z movement motor is mounted on said mounting beam; and;
means for moving said platform by increasing a portion of said YZ movement line on one side of said platform.

5. The method according to claim 4 further comprising:
means for rotating said Y movement motor;
means for rotating said Z movement motor; and,
means for moving said platform.

6. The method according to claim 5 further comprising:
means for coupling said mounting beam to a winch;
means for coupling said winch to a support line;
means for rotating said winch; and,
means for moving said mounting beam.

* * * * *